July 28, 1942.    J. WILSON    2,291,127

PRODUCTION OF TEMPERED GLASS SHEETS

Filed April 18, 1935    4 Sheets-Sheet 1

INVENTOR.
John Wilson
by Dudley & Cole
Attorneys

July 28, 1942.　　　J. WILSON　　　2,291,127
PRODUCTION OF TEMPERED GLASS SHEETS
Filed April 18, 1935　　　4 Sheets-Sheet 2
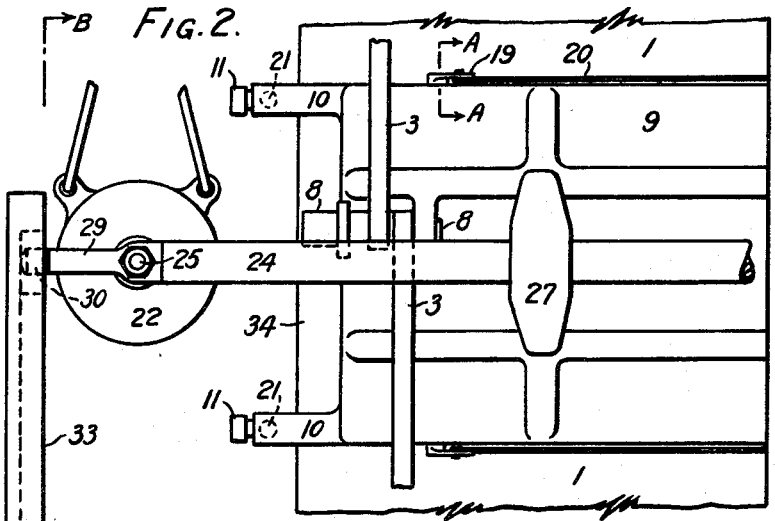
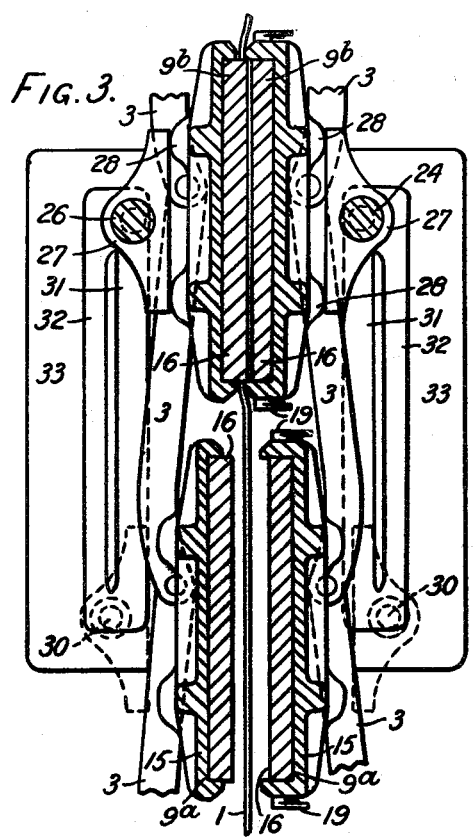
INVENTOR.
John Wilson
by Dorsey & Cole
Attorneys July 28, 1942.　　　J. WILSON　　　2,291,127
PRODUCTION OF TEMPERED GLASS SHEETS
Filed April 18, 1935　　　4 Sheets-Sheet 3
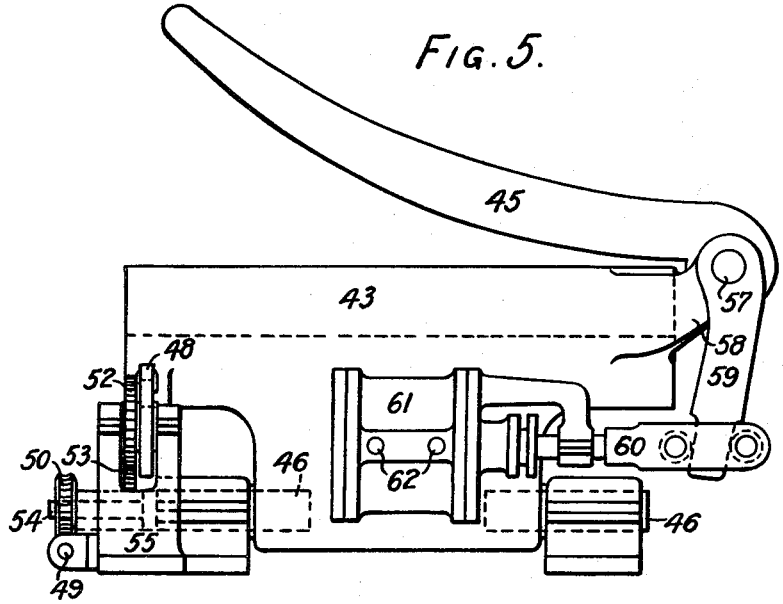
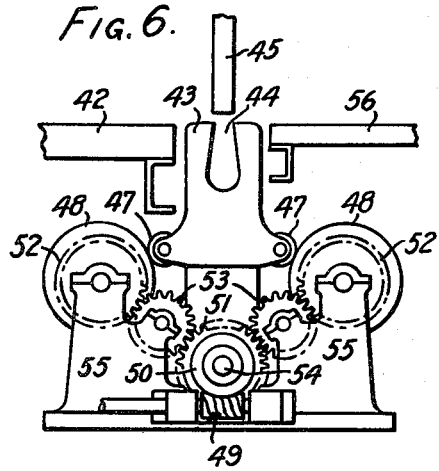
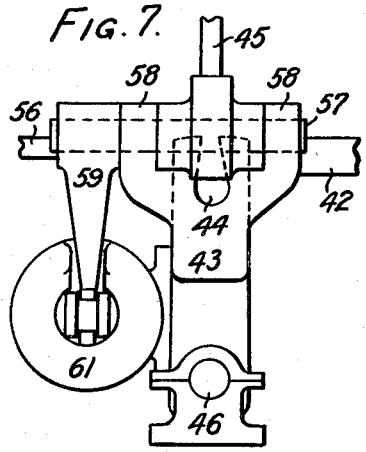
INVENTOR.
John Wilson
by Dorsey & Cole
Attorneys

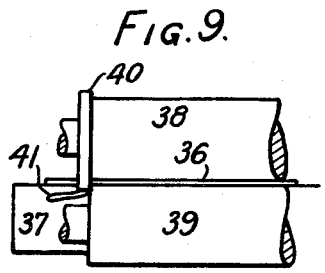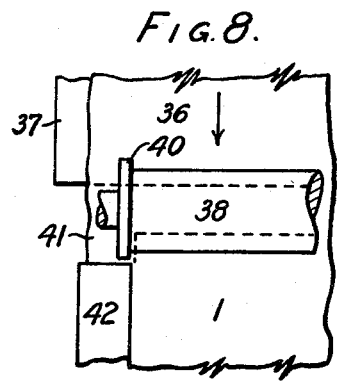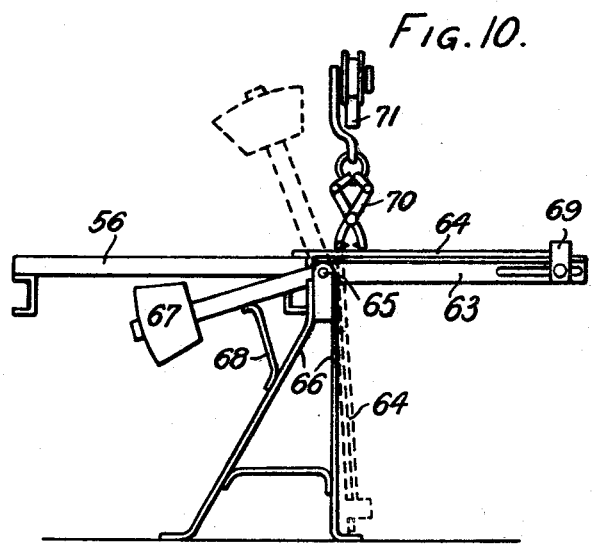

UNITED STATES PATENT OFFICE 2,291,127

PRODUCTION OF TEMPERED GLASS SHEETS

John Wilson, Birmingham, England, assignor to The American Securit Company, Wilmington, Del.

Application April 18, 1935, Serial No. 17,103
In Great Britain April 28, 1934

16 Claims. (Cl. 49—79)

This invention relates to the tempering of glass sheets and has for its objects an improved process and apparatus therefor.

As heretofore practised, glass sheets are made by one of the known methods and are annealed and, when cold, are cut to size, and then again heated and cooled rapidly.

According to the invention the processes of annealing, cooling and reheating are avoided with consequent saving of the heat employed in annealing and reheating and of the labour involved in these processes.

Further, the tempering of glass is based on the temperature of the inner layers of the glass, since these must remain viscous at a time when the outer layers are substantially rigid. Now, in heating a cold sheet of glass, the outer layers rise in temperature more rapidly than the inner layers and therefore the sheet must be heated to an average temperature which is higher than the necessary temperature of the inner layers. In the manufacture of sheets of glass, however, the reverse is the case, since the outer layers are at a lower temperature than the inner layers, by reason of their contact with the air or with the forming rolls. For a given temperature of the inner layers therefore the average temperature of the sheet is lower in a sheet which has not been annealed after formation than in a sheet which has been cooled and reheated. Since the distortion of a sheet during tempering depends on its average temperature, the lower average temperature required in the process according to this invention is of advantage.

According to the invention, glass, formed in flat form by drawing or rolling is cut into sheets of the desired size while the glass is still plastic and the cut and unannealed sheets are then cooled rapidly to temper them. The temperature of the cut sheets may be adjusted if necessary either by heating or cooling them slightly as a whole or by heating or cooling them locally to render their temperature uniform. The glass may be cut into sheets by stamping dies, and these may contain metal plates, which are brought into contact with the sheets in the stamping operation and are adapted to cool them rapidly either by their heat capacity or by water cooling. In the case of drawn glass, the stamping dies are conveniently mounted on chains and, by the movement of the chains operate to draw the glass. In the case of rolled glass, the edges of the strip are preferably sheared off by a cutting roll, and the strip thus cut to transverse size may be cut across into sheets by shears or otherwise.

In the accompanying drawings:

Figure 2 is a side elevation showing on a larger scale half of one of the stamping dies;

Figure 3 is a vertical section showing two pairs of stamping dies;

Figure 4 is a part section on the line A—A of Figure 2 on a larger scale;

Figure 5 is a front elevation of an apparatus for shearing across a strip of glass formed by rolling;

Figures 6 and 7 are views of the left and right hand ends respectively of the same, in each case omitting the parts at the other end;

Figure 8 is a part plan view of the device for cutting off the edges of the strip;

Figure 9 is a vertical section thereof through the centre of the rollers, these being shown in elevation, and Figure 10 is a side view of the apparatus for removing the cut sheet of glass for tempering.

Figure 1:
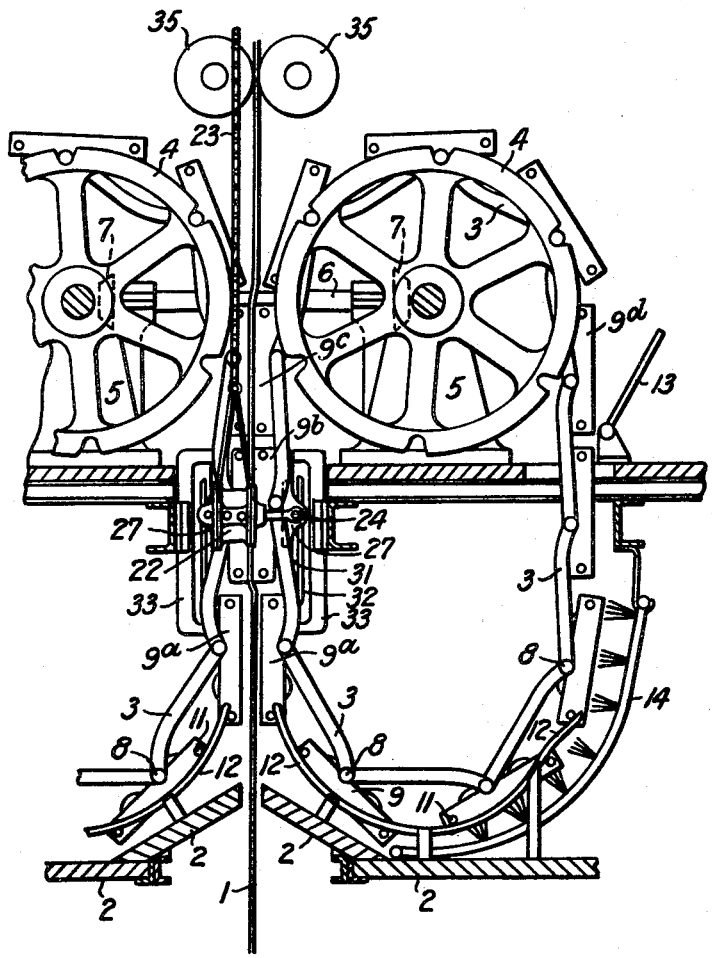
Figure 1 is substantially a front elevation of an apparatus (partly broken away) for stamping sheets from a drawn strip.

Referring to Figure 1, 1 is a strip of glass being drawn from a bath below the screens 2. Two chains, one on each side of the glass, with links 3, pass over two pairs of chain wheels 4 turning in supports 5 and geared together by a cross shaft 6 and bevel wheels 7. The chain wheels 4 are driven continuously (by means not shown) so as to move the chains at the speed of drawing of the strip 1. Each chain hangs in a loop from its pair of chain wheels 4. The right and left hand chain wheels 4 turn clockwise and counterclockwise respectively. Pivoted to the pin 8 of each link 3, is a stamping die 9. Figure 2 shows on a larger scale one-half of one stamping die 9 with pin 8 and two links 3. The left hand end of this pin 8 engages one chain wheel 4, the die 9 lying between the two wheels of each pair.

The view of Figure 1 is taken on the line B—B of Figure 2, and thus omits the front support 5 of the chain wheels and the guide.

Protruding from each end of each die 9 are two lugs 10 (Figure 2) with rollers 11. These engage rails 12 (Figure 1) at the bottom of the loops formed by the chains, in such a way that the dies 9 in rising to the position of the die 9ª are kept free of the glass strip 1.

At a position a little above that of 9ª, the pair of stamping dies 9 is brought together to stamp a sheet out of the strip 1, by means to be described hereinafter. The dies are shown in their closed position in positions 9ᵇ and 9ᶜ. Above this latter position the dies are separated by the motion of the chains round the chain wheels. The right hand die 9 retains the stamped out sheet and, when it has reached the position 9ᵈ, the sheet is ejected from the die (as will be explained later) and is received on the support 13 and removed. Below this position the dies are cooled by water sprays from the pipe 14.

Referring now to Figure 3, two pairs of stamping dies are shown in cross section in open and closed position 9ª and 9ᵇ respectively. Each die 9 consists of a casing 15 containing a massive plate 16 having its surface facing the glass polished. The plate 16 is sunk in the right hand casing 15, but protrudes from the left hand casing, the edges of the left hand plate and the edges of the right hand casing co-operating to shear the glass, while the sheared out sheet of glass is pressed into the right hand casing between the two plates 16, as shown in the position 9ᵇ of the dies. The plate 16 in the right hand casing is loose therein and is held in place by four eccentric pins 17 (Figure 4) engaging slots in the plate 16, the pins 17 being on pins 18 adapted to turn in the casing 15. Arms 19 (Figure 4) are attached to the pins 18 outside the casing, and the two arms on each side of the casing 15 are connected by a link 20. By turning the arms 19 on the two sides of the die through 90 degrees, the eccentric pins 17 press the plate 16 outwards from the casing 15 and eject the glass sheet. Registering pins and sockets are fixed to the lugs 10 (shown in dotted lines at 21 in Figure 2) to ensure accurate registration of the dies 9 in coming together.

The device for pressing the dies 9 together to stamp out a sheet is as follows: A pneumatic cylinder 22 (Figures 1 and 2) is suspended by chain 23 beyond each edge of the glass strip 1. The chains 23 pass over two pulleys (not shown) on a single shaft and are provided with counterweights which do not quite balance the cylinders and their attached parts. A bar 24 (Figures 1, 2 and 3) is attached to the piston rods 25 of the two cylinders 22, passing behind the right hand die 9. A similar bar 26 (Figure 3) is attached to the bodies of the cylinders and passes behind the left hand die. The bars 24 and 26 each carry two yokes 27 adapted to bear against projections 28 on the backs of the casings 15. The yokes 27 on the bars 24 and 26 can be pressed together or moved apart by admitting air under pressure into one or the other end of the pneumatic cylinders 22.

In Figure 3, the yokes are shown in dotted lines clear of the dies 9ª which are in open position. When the dies, by the movement of the chain, have reached the position 9ª in Figure 3, air is admitted to the cylinders 22 to bring the yokes 27 towards one another and so press the dies together to stamp out the sheet. The dies remain pressed together by the yokes until the position 9ᵇ of Figure 3 is reached, the cylinders 22, bars 24 and 26 and yokes 27 moving with the dies, and then air is admitted to the other end of the cylinders 22 to cause the yokes to separate. The dies, however, remain in closed position until they are drawn apart by the chain movement as indicated in Figure 1. The sheets are tempered by the rapid transfer of heat from the sheets to the plates 16. The cylinders 22 are guided by means of rods 29 (Figure 2) which are continuations of the bars 24 and 26. The rods 29 terminate in rollers 30, each of which engages parallel grooves 31 and 32 in guide plates 33. When the cylinders 22, with their bars 24 and 26 and yokes 27 are in their lowest position (in dotted lines in Figure 3), clear of the dies, the rollers 30 are at the bottom of the outer grooves 32. They are then free to move to the bottoms of the inner grooves 31, when air is admitted to the cylinders to stamp out the sheet. As the cylinders, bars and yokes rise with the dies, the rollers 30 travel up the inner grooves 31 until, when the position of the bars and yokes shown in full lines is reached, and air is admitted to cause the yokes to separate, the rollers 30 pass into the upper end of the outer grooves 32. The cylinders, bars and yokes then fall to their lowest position, by reason of their not being fully counterbalanced. The valves (not shown) for admitting air to the cylinders 22 are conveniently operated automatically by means connected with the chain wheel shafts, so that the cylinders are operated when each die 9 reaches the positions 9ª and 9ᵇ of Figure 3. The length of upward travel of the cylinders 22 must be a little less than the pitch of the links 3, so that their time of rise plus their time of fall is equal to the time of movement of the chain through the length of its pitch.

The edges 34 of the strip (Figure 2) remain intact and are drawn upwards by the rollers 35 (Figure 1).

An alternative method of carrying out the invention is shown in Figures 5 to 10, and is adapted for use with strip or long sheets produced by rolling, the cut out sheets being cooled by air blasts in the usual way. Referring to Figures 8 and 9, 36 is the strip which is travelling in the direction of the arrow on the bed 37. The strip passes between a pair of rollers 38 and 39, the roller 38 having end flanges 40 which co-operate with the ends of the roller 39 to shear off the edges 41 of the strip. The strip, thus cut to transverse size, continues to travel over the bed 42. This bed is shown in Figure 6 and ends before a transverse cutting device consisting of the slotted member 43, with slot 44 and the knife 45 (Figures 5, 6 and 7). The knife 45 is adapted to enter the slot 44 and, in so doing, to shear off a narrow strip of glass. The member 43 is pivoted on trunnions 46 and, when a transverse cut is to be made, is caused to turn so that its upper surface travels to the right (as viewed in Figure 6) with the speed of the strip while the cut is made, and then to return. This motion is given to it by means of the rollers 47 pivoted to the member 43, which are engaged by two cams 48. The cams 48 are turned simultaneously by the worm 49, and wheel 50, which is connected with a gear wheel 51, which drives gear wheels 52, attached to the cams 48, through idle wheels 53. The worm wheel 50 and gear wheel 51 turn on an extension 54 of the left hand (in Figure 5) trunnion 46. The cams 48 and gear wheels 52 and 53 turn in bearings in a frame 55. The worm 49 may be driven from the strip rolling mechanism through a clutch or by an independent motor. In Figure 6, the slotted member 43 is shown in its mid position, its travel being from a position close in front of the bed 42 to a position close behind the bed 56.

The knife 45 is keyed to a shaft 57 turning in brackets 58 on the member 43. Also keyed to the shaft 57 is a depending arm 59, which is engaged by the piston rod 60 of a pneumatic cylinder 61 fixed on the member 43, provided with ports 62. By admitting air into the left hand end of the cylinders 61, the knife 45 is caused to descend and shear off a transverse strip of glass, and it is raised again by admission of air into the other end of the cylinder.

In operation, when the strip (which has already been cut to transverse size as described) has passed from the bed 42 over the member 43 (then in its left hand position) on to the bed 56, to the desired length, rotation of the worm 49 is started to move the member 43 with the strip, and then air is admitted to the cylinder 61 to shear off a narrow strip, and, immediately after to raise the knife. The member 43 then returns to its left hand position, sliding under the oncoming strip as it does so.

Referring now to Figure 10, which shows the bed 56 on which the cut off length of strip lies, the cut off length is drawn forward, by means of a hooked stowing tool, inserted into the gap left by the knife, on to the pivoted bed 63, where it occupies the position shown in full lines at 64. The bed 63 is pivoted at 65 to a supporting frame 66 and is provided with a counterweight 67, slightly overbalancing it, so that it normally occupies the full-line position shown, determined by the stop 68. On receiving the sheet of glass 64, the counterweight 67 is overbalanced and the bed 63 falls into the position indicated by dotted lines. The position of the sheet of glass on the bed 63 is determined by an adjustable stop 69, so that a short length of the sheet 64 projects clear above the level of the bed 56, when the sheet is in the nearly vertical position shown in dotted lines. This projecting portion is then engaged by tongs 70 of the usual form, which are brought above the plate on a suspended rail 71, which is then raised and moved to bring the sheet between blowing frames of the usual kind.

Any of the known methods of cooling may be applied to the sheets, whether these are cut by stamping dies or by shearing operation.

When the cooling is done by means other than metal plates combined with the stamping dies, it may be advisable to adjust the temperature of the cut sheets, as by heating them if they have become too cool during the cutting and conveying operations, or by heating or cooling one side relatively to the other, or the edges relatively to the centre, if the cutting and conveying operations have produced inequalities in the surface temperature.

Having described my invention, I declare that what I claim is:

1. Process of making tempered glass sheets in which the glass is formed in flat form by drawing or rolling, characterised by cutting the formed sheets to size while still plastic and immediately cooling them rapidly.

2. Process of making tempered glass sheets in which the glass is formed in flat form by drawing or rolling, characterised by shearing off the edges of the formed sheets and cutting them transversely while the glass is still plastic and immediately cooling them rapidly.

3. The method of tempering a glass sheet which consists in fashioning a sheet of glass into final shape from a supply body, utilizing and regulating the heat of formation of the sheet to establish in the sheet a temperature suitable for tempering, and thereafter rapidly cooling the sheet.

4. Process of making tempered glass sheets which consists in withdrawing a continuous ribbon of plastic glass from a supply body, cutting said ribbon into individual sheets while said ribbon is still plastic and in motion, and thereafter rapidly chilling the sheet.

5. In apparatus for producing tempered glass sheets, the combination of means for forming a flat plastic ribbon of glass from a supply body, stamping dies adapted to cut said plastic ribbon into individual sheets, water cooled plates associated with the stamping dies and arranged to rapidly chill the sheets upon contact therewith, and means for cooling said plates.

6. In apparatus for producing tempered glass sheets, the combination of means for drawing a flat plastic ribbon of glass from a supply body and thereafter cutting said ribbon into individual sheets, and means for rapidly chilling the sheets subsequent to the cutting thereof.

7. In apparatus for producing tempered glass sheets, the combination of a plurality of stamping dies arranged to engage and draw a flat plastic ribbon of glass from a supply body, means for moving said stamping dies in a plane parallel to the plane of draw of the ribbon and in a plane transverse thereto to separate said ribbon while plastic into a plurality of individual sheets, and means for rapidly chilling the individual sheets.

8. In apparatus for producing tempered glass sheets, the combination of a plurality of stamping dies arranged to engage and draw a flat plastic ribbon of glass from a supply body, means for moving said stamping dies in a plane parallel to the plane of draw of the ribbon, and in a plane transverse thereto to separate said plastic ribbon while moving into a plurality of individual sheets, and means for rapidly chilling said sheets.

9. In apparatus for producing tempered glass sheets, the combination of a plurality of stamping dies arranged to engage and draw a flat plastic ribbon of glass from a supply body, a continuously travelling chain and mechanism associated therewith for moving said stamping dies in a plane parallel to the plane of draw of the ribbon, and in a plane transverse thereto to separate said ribbon while plastic into a plurality of individual sheets, and means for rapidly chilling said sheets.

10. The method of tempering a glass sheet which consists in withdrawing a substantially flat ribbon of plastic glass from a molten supply body, cutting said ribbon into individual sheets, utilizing and regulating the heat of formation of the ribbon and sheet to establish in the sheet a temperature suitable for tempering, and thereafter rapidly chilling the sheet.

11. The method of tempering a glass sheet which consists in continuously withdrawing a substantially flat ribbon of plastic glass from a molten supply body, cutting said ribbon into individual sheets while said ribbon is moving, utilizing and regulating the heat of formation of the ribbon and sheet to establish in the sheet a temperature suitable for tempering, and thereafter rapidly chilling the sheet.

12. Process of making tempered glass sheets which consists in withdrawing a continuous ribbon of plastic glass from a supply body, cutting the said ribbon into individual sheets by shearing the glass round the whole periphery of the sheets, while the said ribbon is still plastic and in motion and thereafter applying cooling means equal and of like nature to the two sides of each of the said sheets to cool them rapidly.

13. Process of making tempered glass sheets which consists in withdrawing a continuous ribbon of plastic glass from a supply body, cutting the said ribbon into individual sheets by shearing the glass round the whole periphery of the sheets, while the said ribbon is still plastic and in motion, subjecting the said sheets while still hot to thermal treatment to equalize their temperature throughout and immediately applying cooling means equal and of like nature to the two sides of each of the said sheets to cool them rapidly.

14. Process of making tempered glass sheets which consists in withdrawing a continuous ribbon of plastic glass from a supply body, shearing off the edges of the glass strip, shearing narrow transverse strips from the strip to cut it into individual sheets and thereafter applying cooling means equal and of like nature to the two sides of each of the said sheets to cool them rapidly.

15. In apparatus for producing tempered glass sheets, the combination of means for forming a flat plastic ribbon of glass from a supply body, stamping dies adapted to cut said plastic ribbon into individual sheets, water cooled plates associated with stamping dies and arranged to chill the sheets rapidly, upon contact therewith, means for pressing the glass sheets between the metallic plates and means for cooling said plates.

16. A process of making tempered glass sheets in which the glass is formed in flat form by drawing or rolling, characterized by cutting the formed sheets to size round the whole of their periphery while they are still plastic, immediately heating the cut sheets and then cooling them rapidly to temper them.

JOHN WILSON.